(12) United States Patent
Hung et al.

(10) Patent No.: US 9,523,878 B2
(45) Date of Patent: Dec. 20, 2016

(54) DISPLAY DEVICE CAPABLE OF DISPLAYING A CONTINUOUS IMAGE

(71) Applicant: HON HAI PRECISION INDUSTRY CO., LTD., New Taipei (TW)

(72) Inventors: Yi Hung, New Taipei (TW); Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 52 days.

(21) Appl. No.: 14/687,668

(22) Filed: Apr. 15, 2015

(65) Prior Publication Data

US 2016/0070128 A1 Mar. 10, 2016

(30) Foreign Application Priority Data

Sep. 9, 2014 (TW) .............................. 103131058 A

(51) Int. Cl.
| | |
|---|---|
| *G02F 1/1347* | (2006.01) |
| *G02F 1/1333* | (2006.01) |
| *G02F 1/1335* | (2006.01) |
| *G02B 5/04* | (2006.01) |
| *G02B 5/18* | (2006.01) |
| *G02B 27/42* | (2006.01) |

(52) U.S. Cl.
CPC ........... *G02F 1/13336* (2013.01); *G02B 5/045* (2013.01); *G02B 5/1885* (2013.01); *G02B 27/4277* (2013.01); *G02F 1/133504* (2013.01); *G02F 1/133524* (2013.01)

(58) Field of Classification Search
CPC ..................... G02F 1/133504; G02F 1/133524; G02F 1/13336; G02F 1/133606; G02F 1/133526; G02F 2001/133607; G02F 1/133611;G02F 1/133608; G02F 2001/133562; G02F 1/13471; G02F 1/1347; G02F 1/133615; G02F 2001/133342; G02F 1/133308; G02F 1/133377; G02F 2001/133616; G02F 2201/122; G02B 5/04; G02B 5/1876; G02B 5/02; G02B 6/0051; G02B 5/0257; G02B 6/0053; G02B 5/045
USPC ......................................................... 349/74
See application file for complete search history.

(56) References Cited

U.S. PATENT DOCUMENTS

| | | | |
|---|---|---|---|
| 6,104,446 A * | 8/2000 | Blankenbecler .. | G02F 1/133621 349/5 |
| 2010/0073641 A1* | 3/2010 | Han .................. | G02B 5/06 353/38 |
| 2013/0343038 A1* | 12/2013 | Niu .................. | G09F 13/04 362/97.1 |

* cited by examiner

*Primary Examiner* — Hoan C Nguyen
(74) *Attorney, Agent, or Firm* — Zhigang Ma

(57) ABSTRACT

A display device includes display units arranged in an array and a light guide unit. Each display unit includes a display panel including a display surface configured for displaying an image, and a frame located adjacent to edges of the display surface. The light guide unit includes a lower light guide and an upper light guide. The lower light guide is located above the display units, and includes first gratings. Each first grating corresponds to a side of one of the display unit and is configured for refracting light emitted from the display surface towards the corresponding side of the display unit. The upper light guide is located above the lower light guide and includes second gratings. Each second grating corresponds to one of the first gratings and is configured for reversely refracting light transmitted through the first grating towards a center of the display unit.

11 Claims, 5 Drawing Sheets

DISPLAY DEVICE CAPABLE OF DISPLAYING A CONTINUOUS IMAGE

FIELD

The subject matter herein generally relates to a display device including a number of display units.

BACKGROUND

A display device includes a number of display units arranged in an array. In the array each display unit has a frame surrounding a display panel; an image displayed by the display device is divided into separated portions by the frames.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
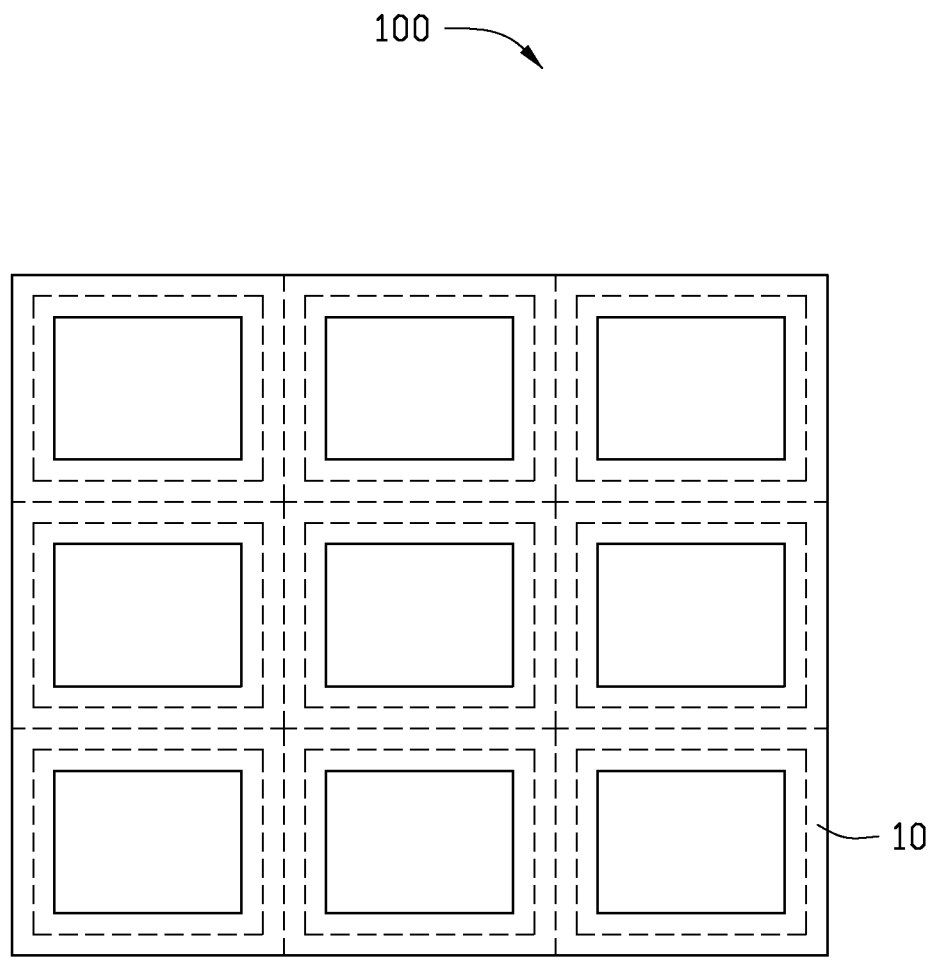
FIG. 1 is a diagrammatic view of a display device according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to a display device.

Figure 2:
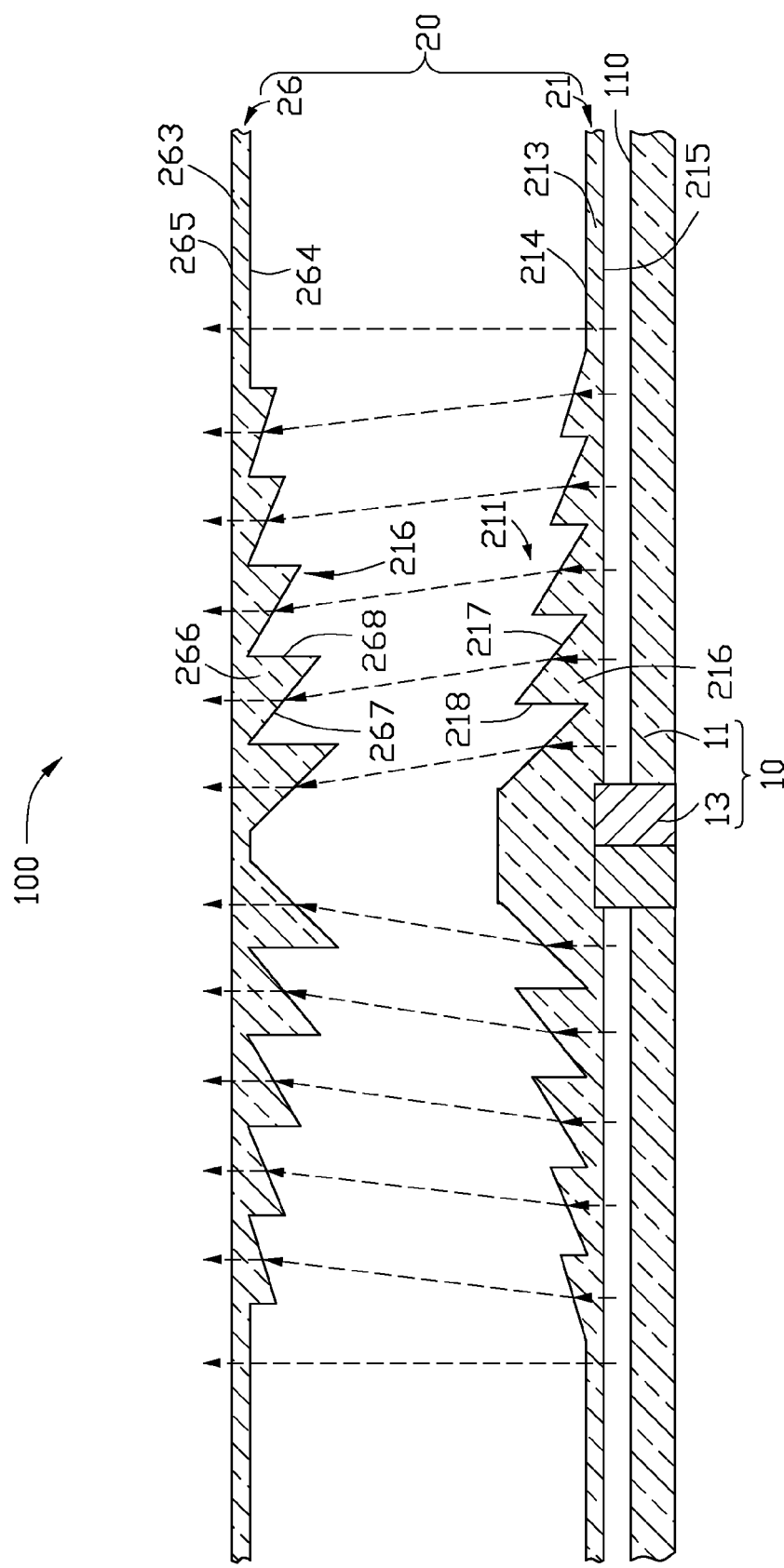
FIG. 2 is a cross sectional view of the display device of FIG. 1.

FIGS. 1 and 2 show a display device 100 according to a first embodiment of the present disclosure. The display device 100 includes a number of display units 10 arranged in an array. In the embodiment, the display device 100 includes nine display units 10. The display units 10 form a 3-by-3 array. There are no gaps between each two adjacent display units 10.

In this embodiment, the display unit 10 is a liquid crystal display. In other embodiments, the display unit 10 can also be any known type of display, such as a plasma display, for example. Each of the display units 10 includes a display panel 11 and a frame 13.

The display panel 11 includes a display surface 110 for displaying images; the edges of the display panel 11 are mounted on the frame 13. The frame 13 surrounds the display surface 110 and supports the display panel 11. The frame 13 is made of opaque resin.

The display device 100 further includes a light guide unit 20. The light guide unit 20 includes a lower light guide 21 covering the number of display units 10 and an upper light guide 26 above the lower light guide 21.

The lower light guide 21 and the upper light guide 26 are made of transparent material, such as transparent resin. The lower light guide 21 includes a number of first gratings 211. Each first grating 211 corresponds to a side of the display unit 20 and is located above the corresponding side of the display unit 20, including the frame 13 and parts of the display surface 110 adjacent to the frame 13. The lower light guide 21 further includes a number of first flat portions 213 located between the first gratings 211. The first flat portions 213 are located above the display surfaces 110. The upper light guide 26 includes a number of second gratings 261 and a number of second flat portions 263. Each second grating 261 is located above a corresponding first grating 211. Each second flat portion 263 is located above a corresponding second flat portion 213. In other embodiments, the lower light guide 21 does not include the first flat portion 213, and the upper light guide 26 does not include the second flat portion 263.

The lower light guide 21 includes a first surface 214 facing the upper light guide 26 and a second surface 215 opposite to the first surface 214. The second surface 215 is parallel to the display surface 110. The first grating 211 is formed on the first surface 214. The first grating 211 refracts light emitted from the display surface 110 towards the corresponding side of the display unit 10 at deflection angles. The deflection angles are relative to a refractive index of the light guide 21 and a shape of the first grating 211. Each first grating 211 includes a number of first prisms 216 parallel to each other. An extending direction of the first prism 216 is parallel to the corresponding side of the display unit 10. Each first prism 216 includes a first prism surface 217 and a second prism surface 218 connected to each other. The second prism surface 218 is nearer to the frame 13 relative to the first prism surface 217 of the same first prism 216. One second prism surface 218 right above the frame 13 is substantially parallel to the second surface 215. The other second prism surfaces 218 are substantially perpendicular to the second surface 215. The first prism surface 217 and the second surface 215 form an acute angle, thus refracting light towards the side of the display unit 10.

In this embodiment, included angles between the first prism surfaces 217 and the second surface 215 gradually decrease from the frame 13 towards the center of the display panel 11. As a result, deflection angles of the light passing through the first grating 211 gradually decrease from the frame 13 towards the center of the display panel 11, which decreases distortion of the image displayed by the display device 100.

The upper light guide 26 includes a third surface 264 facing the lower light guide 21 and a fourth surface 265 opposite to the third surface 264. The fourth surface 265 is parallel to the display surface 110. The second grating 261 is formed on the third surface 264. The second grating 261 refracts light extending through the first grating 211 to a direction perpendicular to the display surface 110.

Each second grating 261 includes a number of second prisms 266 parallel to each other. An extending direction of the second prism 266 is parallel to the corresponding side of the display unit 10. Each second prism 266 includes a third prism surface 267 and a fourth prism surface 268 connected to each other. The third prism surface 267 is nearer to the frame 13 relative to the fourth prism surface 268 of the same second prism 266. The fourth prism surface 268 is substantially perpendicular to the fourth surface 265. The third prism surface 267 is located above and parallel to a corresponding first prism surface 217. The third prism surface 267 and the fourth surface 265 form an acute angle.

Figure 3:
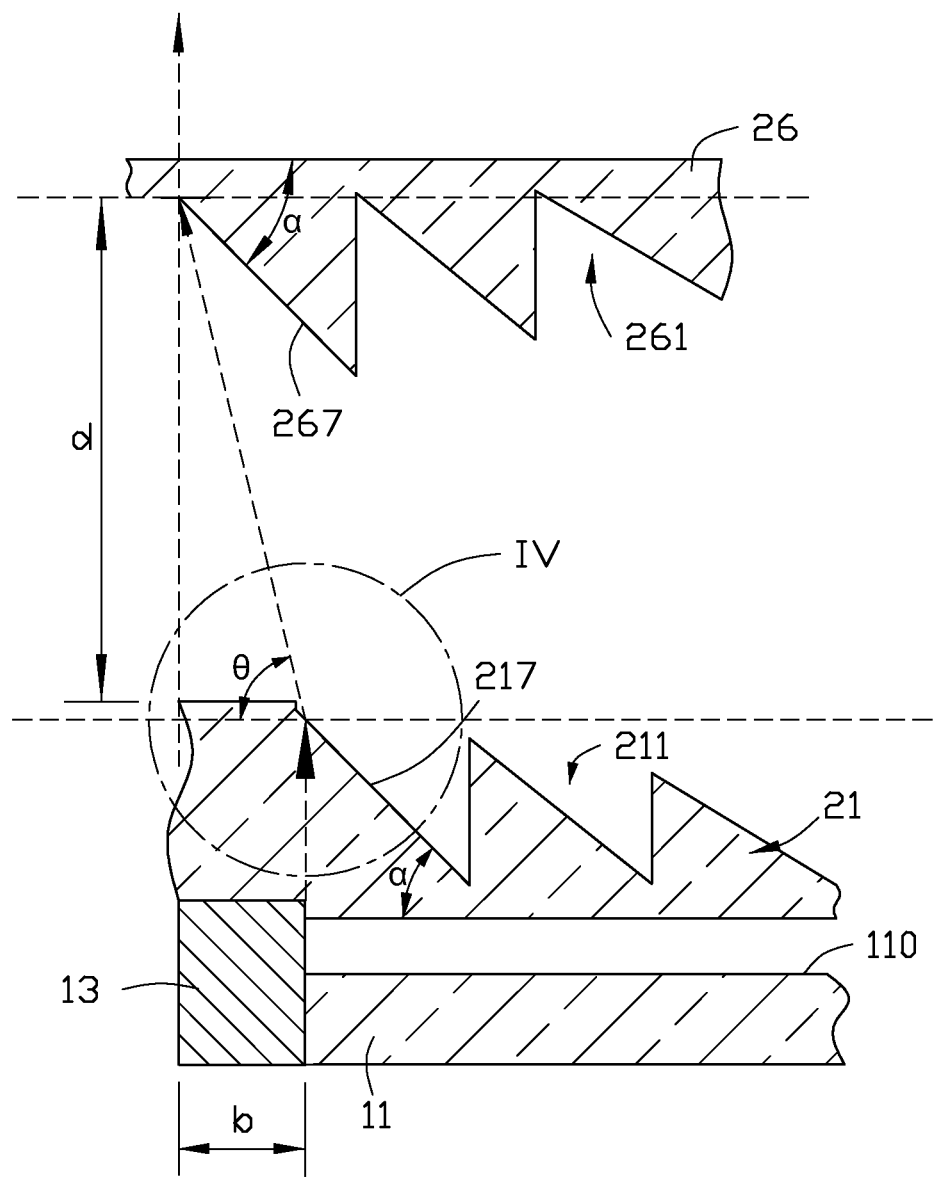
FIG. 3 is a partial, enlarged view of FIG. 2.
Figure 4:
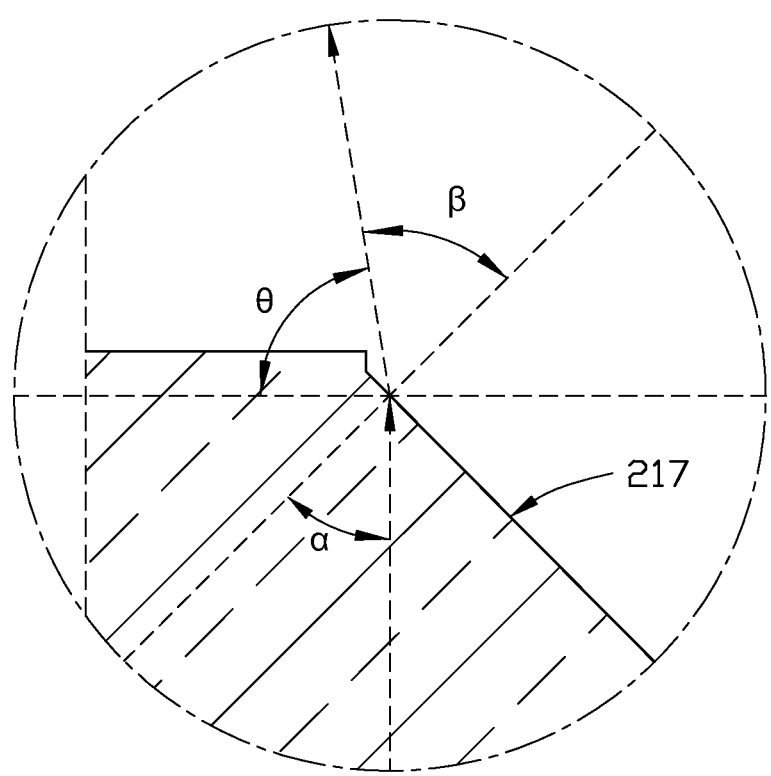
FIG. 4 is an enlarged view of circled portion IV of FIG. 3.

FIGS. 3 and 4 show an included angle α between one of the first prism surfaces 217 nearest to the frame 13 relative to other first prism surfaces 217 and the second surface 215 can be calculated according to three following formulas:

$$b^* \tan(\theta) = d \quad (1)$$

$$n_2^* \sin \alpha = n_1^* \sin \beta \quad (2)$$

$$\theta = \alpha + \pi/2 - \beta \quad (3)$$

Wherein b is a width of the frame 13, d is a distance between the first grating 211 and the second grating 261, θ is a deflection angle of the light emitting from the first prism surface 217, n2 is refraction indexes of the first and second gratings 211, 261, n1 is a refraction index of the air, and β is an emergent angle of the light emitting from the first prism surface 217.

When working, optical signals representing portions of an image emitted from each display surface 110 are directed above the frame 13 by the first grating 211. As a result, the frame 13 is invisible outside the display device 100 and the display device 100 can display a continuous image which is not separated by the frame 13.

Figure 5:
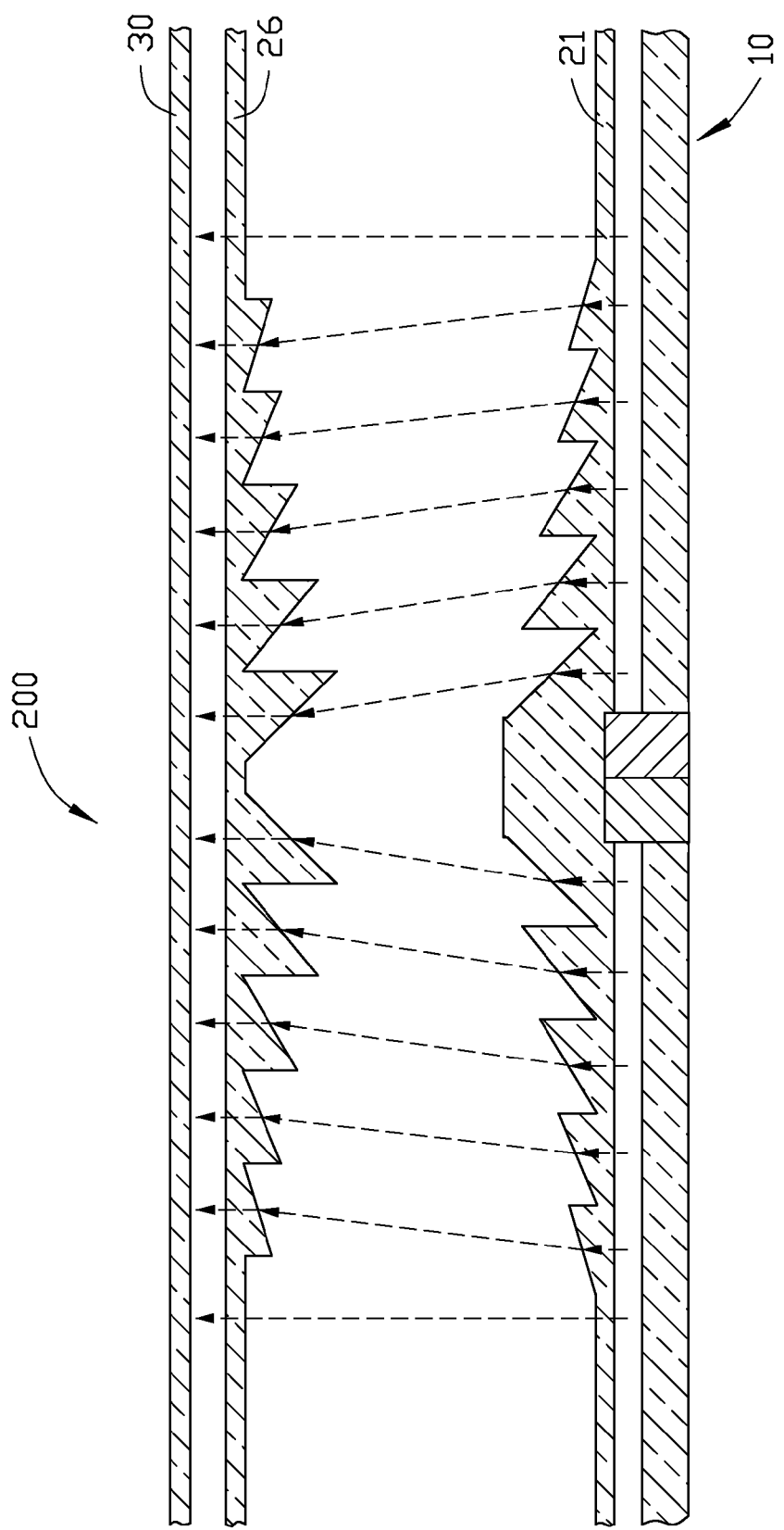
FIG. 5 is a cross sectional view of a display device according to a second embodiment of the present disclosure.

FIG. 5 shows a display device 200 according to a second embodiment of the present disclosure. The display device 200 is similar to the display device 100 except for further including a protective cover 30 above the upper light guide 26. The protective cover 30 is made of transparent material, such as glass or resin, and is used for protecting the light guide unit 20 from pollution and damage.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. A display device comprising:
   a plurality of display units, each display unit having:
      a display panel with an outer display surface having one or more peripheral edges, the display panel being configured to display images; and
      a frame positioned along at a portion of the one or more peripheral display panel edges;
   wherein, the plurality of display units are arranged in an array with a portion of one of each display unit frame and outer display surface edges abutting a portion of one of another display unit frame and outer display surface edges; and
   a light guide unit having:
      a plurality of first gratings forming a first light guide, each of the plurality of first gratings having a first side facing the outer display surface of the plurality of display units, a second side facing opposite the first grating first side and a peripheral edge, with each first grating corresponding to one of the plurality of display units and configured to refract light emitted from the display panel of the display unit towards the peripheral edge of the first grating; and
      a plurality of second gratings forming a second light guide, each of the plurality of second gratings having a first side facing the second side of the first light guide, a second side facing opposite the first side and a peripheral edge, with each second grating corresponding to one of the plurality of first gratings and configured to reversedly refract light emitted from a display panel of the display unit and through a first grating, away from the peripheral edge of the second grating;
   wherein, a plurality of first prisms are formed in each second side of the plurality of first gratings, with each of the plurality of first prism having a first prism first surface and a first prism second surface, the second surface of each first prism being positioned closer to the peripheral edge of the first grating than the first surface of each first prism, and the first prism surface of each first prism being at an angle to a plane of the first grating;
   wherein, a plurality of second prisms are formed in each first side of the plurality of second gratings, with each of the plurality of second prisms having a second prism first surface and second prism second surface, with each of the plurality of second prisms formed to correspond to one of the plurality of first prisms and with the first prism first surface being substantially parallel to the first surface of a corresponding second prism;
   wherein, each first grating has a peripheral first prism positioned nearest each first grating peripheral edge, and an angle between the first surface of each peripheral first prism is calculated according to the following formula:

$$b^* \tan(\theta) = d; \quad (1)$$

$$n_2^* \sin \alpha = n_1^* \sin \beta; \quad (2)$$

$$\theta = \alpha + \pi/2 - \beta; \text{ and} \quad (3)$$

wherein, b represents a width of the frame, d represents a distance between a plane of the first grating and a plane of the second grating, θ is a deflection angle of the light emitting from the nearest first prism surface, n2 is refraction indexes of the first grating and second grating, n1 is a refraction index of the air, and β is an emergent angle of the light emitting from the nearest first prism surface and α is an angle between the first surface prism and first side facing of first gratings.

2. The display device of claim 1, wherein the display units are liquid crystal display units.

3. The display device of claim 1, wherein along a direction from the corresponding side of the display unit to a center of the display unit, angles formed between the first prism surface and the display surface gradually decrease.

4. The display device of claim 3, wherein the second prism surface is perpendicular to the display surface.

5. The display device of claim 3, wherein the second prism surface is nearer to the corresponding side of the display unit relative to the first prism surface of the same first prism.

6. The display device of claim 3, wherein the lower light guide further comprises a plurality of first flat portions located between the first gratings.

7. The display device of claim 1, wherein each second prism comprising a fourth prism surface connected to the third prism surface.

8. The display device of claim 7, wherein the fourth prism surface is perpendicular to the display surface.

9. The display device of claim 7, wherein the third prism surface is nearer to the corresponding side of the display unit relative to the fourth prism surface of the same second prism.

10. The display device of claim 7, wherein the upper light guide further comprises a plurality of second flat portions located between the second gratings.

11. The display device of claim 1, further comprising a protective cover located above the upper light guide.

* * * * *